United States Patent [19]

Householder et al.

[11] Patent Number: 5,595,319
[45] Date of Patent: Jan. 21, 1997

[54] REUSABLE CONTAINER UNIT HAVING SPACED PROTECTIVE HOUSINGS

[75] Inventors: William R. Householder, Johnson City, Tenn.; William M. Arnold; Charles S. Brewer, both of Bristol, Va.

[73] Assignee: Nuclear Containers, Inc., A Tennesse Corporation, Elizabethton, Tenn.

[21] Appl. No.: 399,206

[22] Filed: Mar. 6, 1995

Related U.S. Application Data

[63] Continuation-in-part of Ser. No. 64,670, May 21, 1993, Pat. No. 5,395,007, and Ser. No. 721,182, Jun. 21, 1991, abandoned.

[51] Int. Cl.⁶ ..................................................... B65D 90/04
[52] U.S. Cl. .................. 220/429; 220/437; 220/446; 220/447; 220/448; 220/454; 220/461; 220/465; 220/466; 220/601; 220/612; 220/627; 206/511; 206/594; 206/595; 206/596
[58] Field of Search ............................ 220/1.5, 429, 435, 220/437, 445, 446, 447, 448, 454, 461, 462, 465, 466, 562, 565, 586, 601, 612, 627, 661, 256; 206/503, 511, 594, 595, 596, 598

[56] References Cited

U.S. PATENT DOCUMENTS

| | | | |
|---|---|---|---|
| 1,164,152 | 12/1915 | Wolf | 220/429 |
| 2,017,560 | 10/1935 | Woodley | 220/429 X |
| 2,148,278 | 2/1939 | Rose | 220/448 |
| 2,575,283 | 11/1951 | Menrath | 220/446 |
| 2,596,244 | 5/1952 | Jacket | 220/446 X |
| 3,197,066 | 7/1965 | Denzler et al. | 220/448 X |
| 3,294,271 | 12/1966 | Armbruster | 220/661 X |
| 4,184,609 | 1/1980 | Vorreiter | 220/445 |
| 4,712,711 | 12/1987 | Geering et al. | 220/457 |
| 4,986,436 | 1/1991 | Bambacigno et al. | 220/565 X |
| 4,989,447 | 2/1991 | Gelin | 220/565 |

*Primary Examiner*—Stephen Cronin

[57] ABSTRACT

A reusable container unit for flowable materials, having enhanced puncture resistance and leak containment characteristics, and being readily handleable by conventional fork lift or the like equipment, comprising a substantially closed and continuous first wall providing a containment vessel for flowable material, a substantially closed and continuous second wall providing a protective shell surrounding the vessel and spaced therefrom over at least a major portion of the outer surface thereof to provide protective spacing therebetween, spacer elements positioned between the vessel and shell for substantially maintaining the spacing therebetween, at least one aperture in adjacent portions of each of the vessel and shell and adapted to provide one or more access ports for of the vessel, individual closure devices for each of the apertures, a tubular wall extending between and connecting the apertures forming each access port to provide a conduit for the flow of materials into and out of the vessel.

19 Claims, 3 Drawing Sheets

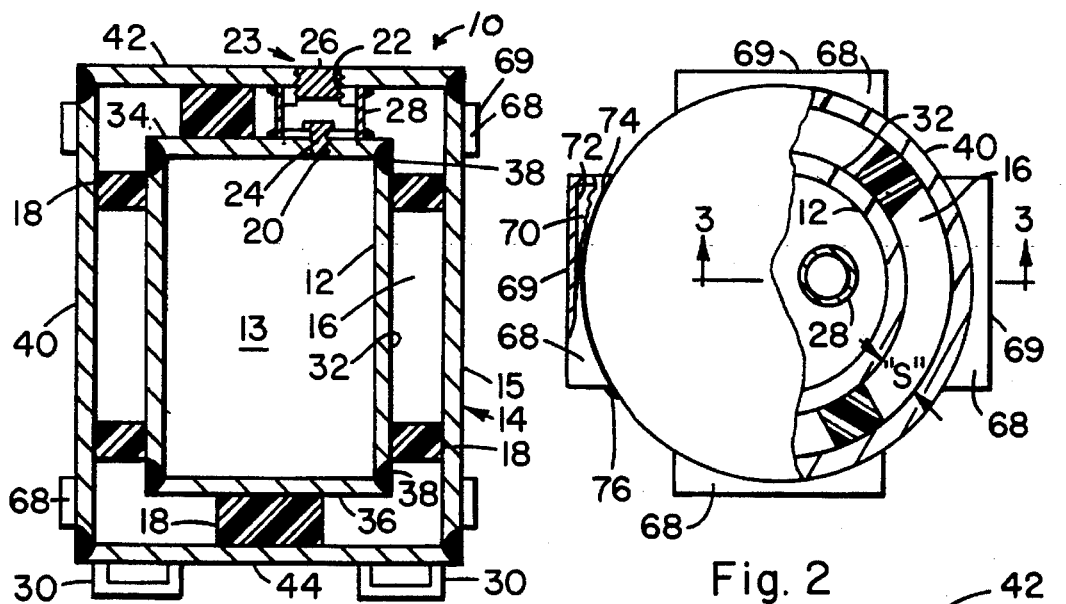

REUSABLE CONTAINER UNIT HAVING SPACED PROTECTIVE HOUSINGS

This application is a continuation-in-part of applicants Ser. No. 08/064,670, filed May 21, 1993, now U.S. Pat. No. 5,395,007, and of its parent Ser. No. 07/721,182 filed Jun. 21, 1991, now abandoned, of same title.

BACKGROUND OF THE INVENTION

1. Field of the Invention

The invention concerns containers having markedly simplified construction and special utility for the bulk shipment of fluid materials which may be of a toxic or otherwise hazardous nature. The invention especially concerns novel construction and features which allow repeated reuse of the container even though it is subjected to rough treatment which normally would puncture or otherwise seriously damage such containers as are presently in use for bulk fluids transport.

Of great concern to the transporter, user, Federal Regulators and environmentalist is the relative ease with which such conventional containers can be damaged, often resulting in leaks and spills of toxic or otherwise dangerous chemicals. Such incidents are particularly common for liquid containers of capacities of up to about 500 or 1000 gallons, which containers are typically moved about and stacked by fork-lift trucks or the like. During such operations, the puncture or other severe damage to the container often occurs. As a result of these experiences, Federal Regulators now substantially restrict the reuse of chemical containers and costly disposal thereof is the necessary consequence.

2. Description of the Prior Art

Heretofore, the concept of structuring fluid transport containers of the type which are readily handleable by lifting apparatus such as fork lift trucks, hand dollies, hand rollable lifts, truck tailgate lifts or the like has been largely limited to such well known containers as the conventional 55 gallon drum. Such drums are typically one-way useable and transportable in accordance with Federal Regulations and consequently they must either be disposed of or reconditioned, both in strict accordance with these regulations.

Further, containers of readily handleable size have not been designed with the specific object of being reusable for toxic or otherwise dangerous fluid materials, particularly not so as to be able to easily withstand the testing rigors of the Federal Regulations covering the structure and performance of such containers while keeping the weight and cost thereof within practical limits. Typical of attempts to solve some of the problems associated with the conventional 55 gallon drum is the disposable container shown in U.S. Pat. No. 4,930,661 wherein a double walled structure of corrugated paper board and plastic is shown. Also, U.S. Pat. No. 4,989,741 discloses an elaborately configured container but one which lacks certain desirable features of penetration resistance and spill containment, and which must be of extremely heavy construction in order to withstand the destructive test forces of the aforesaid Federal Regulations concerning reusable chemical containers.

Objects of the present invention therefore, are: to provide a reusable transport container for fluids wherein the container is so constructed that its mechanical strength, puncture resistance, resistance to leakage damage in the region of its access ports, capacity for leakage containment in the event of puncture, and resistance to significant distortional damage is very high relative to its overall weight; and to provide such a container that is relatively simple in design and economical in construction.

SUMMARY OF THE INVENTION

These and other objects hereinafter appearing have been attained in accordance with the present invention which is defined in its broad sense as a reusable container unit for flowable materials, said unit having enhanced puncture resistance and leak prevention characteristics and comprising a substantially closed first wall means providing containment means for holding said material and preventing leakage therefrom, substantially rigid, protective shell means comprised of substantially closed second wall means surrounding said containment means and spaced therefrom over at least a major portion of the outer surface of said first wall means to provide a protective spacing between said first and second wall means whereby impact forces on said shell means are not readily transmitted to said containment means, spacer cushion means positioned between said first and second wall means for maintaining said protective spacing therebetween, first aperture means through said first wall means, and second aperture means through said second wall means to provide access port means entering into said containment means for filling and emptying the same of flowable material, first closure means for said first aperture means and second closure means for said second aperture means, said first and second closure means being operable for selectively sealing or opening said apertures to allow the filling and emptying of said containment means, said first and second closure means being structurally and operably substantially independent of each other and spaced apart from each other to maintain the integrity of said protective spacing, tubular shaped third wall means having an inner end and an outer end and extending between said first and second wall means and having its said inner end sealingly affixed to said first wall means and its said outer end sealing affixed to said second wall means and encompassing said first and second aperture means respectively to substantially seal said third wall means between said first and second wall means and provide access to said first closure means for providing for the passage of said materials into and out of said containment means, said third wall means being readily distortionable under impact forces applied to said shell means in the vicinity of said second closure means for minimizing the portion of said impact forces transmitted to said first wall means, and base means on said shell means for stabilizing said container unit in at least one position on a supporting floor, base or other groundwork.

In certain preferred embodiments:

(a) at least a major portion of said spacing is filled with one or more impact protective or absorptive materials selected from elastomer, foamed plastic, glass wool, steel wool, fiber wool, particulate absorbent clays, structural plastic, wood, fiber board or other natural or synthetic cellulosic material;

(b) said containment means and shell means are of steel, and the ratio of said spacing thickness to each said first and second wall means thickness is from about 4 to about 100, most preferably from about 30 to 80;

(c) each said first and second wall means substantially defines a drum having substantially cylindrical side means and substantially flat or domed end means, and wherein said aperture means are located in adjacent end means;

(d) said spacer means is distortionable under impact force applied to said protective shell means to thereby provide enhanced energy absorbability and destruction resistance thereto;

(e) said tubular shaped third wall means is readily distortionable within its non-destructive limits under impact force applied against said protective shell means; and (f) said first and second wall means are comprised of material selected from the group consisting of plastic material metal, or plastic material reinforced with metal.

BRIEF DESCRIPTION OF THE DRAWINGS

The invention will be further understood from the following description and drawings wherein certain dimensions are exaggerated for purposes of clarity;

FIG. 1 is a longitudinal or vertical sectional view of a cylindrical embodiment of the present container unit;

FIG. 2 is a cross-sectional view of the unit of FIG. 1 taken along line 2—2 thereof in the direction of the arrows;

FIG. 3 is an enlarged cross-sectional view of the access port means of the unit taken along line 3—3 of FIG. 2 in the direction of the arrows;

FIG. 4 is a top elevational view, with exaggerated angle iron thickness and width, of portions of an outer angle iron framed embodiment of the present container unit;

FIG. 5 is a side elevational view, with portions broken away for clarity, of the unit of FIG. 4;

FIG. 6 is a transverse cross-sectional view of a variation of the container unit showing a substantially square protective shell means;

DESCRIPTION OF THE PREFERRED EMBODIMENTS

Figure 7:
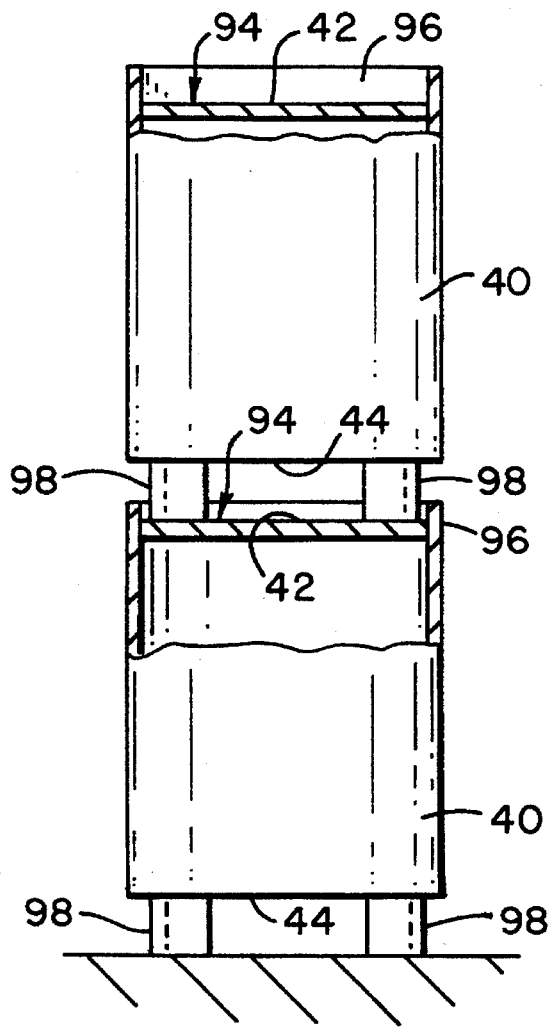
FIG. 7 is a side view, partly in section, of an embodiment of stacked container units provided with spill containment structure.

Referring to the drawings wherein in the several figures the identical or equivalent structures are numbered the same, and with particular reference to the claims hereof, the present container unit comprises substantially closed first wall means 12 providing containment or vessel means 13 for holding said material and preventing leakage therefrom, substantially rigid, protective shell means 15 comprised of substantially closed second wall means 14 surrounding said containment means and spaced therefrom over at least a major portion of the outer surface of said first wall means 12 to provide a protective spacing 16 between said first and second wall means whereby impact forces on said shell means 15 are not readily transmitted to said containment means, spacer cushion means positioned between said first and second wall means for maintaining said protective spacing therebetween, first aperture means 20 through said first wall means, and second aperture means 22 through said second wall means to provide access port means entering into said containment means for filling and emptying the same of flowable material, first closure means 24 for said first aperture means 20, and second closure means 26, for said second aperture means 22, said first and second closure means being operable for selectively sealing or opening said apertures to allow the filling and emptying of said containment means, said first and second closure means being structurally and operably substantially independent of each other and spaced apart from each other to maintain the integrity of said protective spacing 16, tubular shaped third wall means 28 having an inner end 106 and an outer end 108 and extending between said first and second wall means 12, 14 and having its said inner end 106 sealingly affixed to said first wall means and its said outer end sealing affixed to said second wall means and encompassing said first and second aperture means respectively to substantially seal said third wall means 28 between said first and second wall means and provide access to said first closure means for providing for the passage of said materials into and out of said containment means 13, said third wall means 28 being readily distortionable under impact forces applied to said shell means 15 in the vicinity of said second closure means 26 for minimizing the portion of said impact forces transmitted to said first wall means, and base means 30 on said shell means for stabilizing said container unit in at least one position on a supporting floor, base or other groundwork.

With particular reference to FIGS. 1–3 which depict certain preferred embodiments, the first wall means 12 comprises a substantially cylindrical sidewall 32, an upper end cap 34, and a bottom cap 36. These caps are preferably butt-welded as indicated in FIG. 1, rather than fillet-welded, to the sidewall such that the weld, e.g., 38, can be more readily inspected by x-ray in compliance with Federal Regulations. Likewise, second wall means 14 comprises a substantially cylindrical sidewall 40, an upper end cap 42, and a bottom end cap 44. These caps are butt-welded to sidewall 40 as described above. The sidewalls and end caps may be steel, aluminum, brass or metal alloy, but preferably are of carbon or stainless steel. Depending on the impact damage resistance and penetration resistance required, the thickness of the various sidewalls and end caps can be varied, however, unexpected and markedly enhanced overall container strength, and damage and penetration resistance relative to container weight is achieved in accordance with the present invention employing the construction parameters given below.

For containers Experiencing Less Than About 10 psig Internal Pressure:

Thickness of protective shell sidewall—$1/16$ to $3/16$ in.

Thickness of inner vessel sidewall—$1/32$ to $1/8$ in.

Thickness of typically flat end caps—$1/16$ to $5/16$ in.

Container unit loaded weight—300 to about 6,000 lbs.

For Containers Experiencing Up To About 80 psig Internal Pressure:

Thickness of protective shell sidewall—$1/16$ to $3/16$ in.

Thickness of inner vessel sidewall—$3/16$ to $1/2$ in.

Thickness of domed end caps—$3/16$ to $1/2$ in.

Average radius of curved (domed) end cap—5 to 25 ft.

Container unit loaded weight—300–6,000 lbs.

The above parameters generally hold for a wide range of container capacities, e.g., 30, 90, 250, and 500 gallons, wherein the metal thicknesses and the average radii (approximately hemispherical radii) of the curved or domed end caps generally increase as the capacity of the container increases.

The present container of course, in its preferred embodiments, is constructed to comply with Department of Transportation specifications as detailed in SUB PART H, sections: 178.245 Specification 51; 178.251 Specification 56 and 57; 178.252 Specification 56; and 178.255 Specification 60, as applicable.

Figure 8:
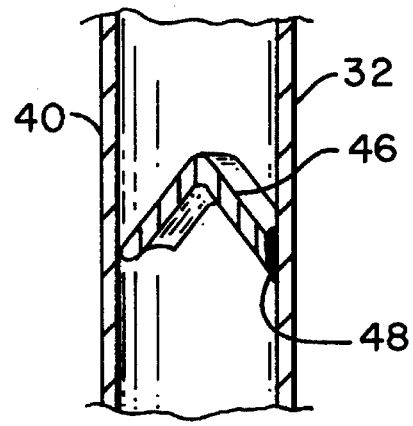
FIG. 8 is a longitudinal sectional view of a variation of the spacer means in place in the spacing.

The spacer means 18 is shown as a plurality of blocks which may be of metal, wood, plastic or hard but preferably somewhat compressible or distortionable rubber or other elastomeric material, preferably cemented at least to the sidewall and end caps of the first wall means such that the containment means 13 with the spacers affixed thereto can be slid down into the protective shell means 15 before its cap 42 is welded thereon. Any shape, configuration or number of spacers may be provided including the distortionable or crushable, shock absorbing, resilient metal, V-shaped spacer 46 of, e.g., 3 inches in width, shown in FIG. 8 as welded at its end 48 to sidewall 32. The spacer may also be comprised of one or more substantially continuous, in-situ, foamed or cured plastic material such as polyurethane, polyvinyl, or thermosetting resins such as epoxies, methacrylate or the like which completely or partially fills the spacing. Also, wood material such as fiber board or plywood may be used, especially for spacing the end caps. In certain embodiments it is preferred that substantial portions of the spacing be filled with absorbent material such as glass wool or other wool-like material, or absorbent clays such as vermiculite, to absorb liquid from penetrations or other damage to the first wall means. It is noted that the type of material or combination of materials used to fill the spacing can be selected to provide the particular desired combination of puncture resistance, liquid absorbability, thermal insulation or the like according to the use to be made of the container unit. It is preferred that some material in addition to the spacers be placed in the spacing, however, for certain container uses, the spacing itself affords adequate puncture resistance, leak-containment, or thermal insulating characteristics, all of which features are referred to herein as being part of the definition of the terms "protective spacing."

A particularly effective material for filling the spacing of container units which must withstand severe impact or puncture forces are the natural and synthetic rubber materials such as described in the literature, e.g., on pages 1028–1037 of Kirk-Othmer, *Concise Encyclopedia Of Chemical Technology,* Copyright 1985 by John Wiley & Sons, Inc.

The inner surface of containment means 13 may be lined or coated with any type of chemical protective coating such as sprayed epoxy or vinyl resins, or slush molded latex elastomer or the like in known manner, preferably after the vessel is completely welded together. Also, removable liners such as rigid or collapsible plastic, metal, metal foil, thermoset polymeric material, ceramic, glass or the like may be employed.

The aperture means 20 and 22 are shown as being threaded for receiving the threaded bung plugs 24 and 26 respectively, having wrench sockets 27. Aperture 22 is, of course, sufficiently large for plug 24 to pass therethrough. An operable structure for the apertures, plugs and the tubular, e.g., cylindrical or square wall means 28 is shown in FIG. 3 as comprising the corrugated sleeve 50 hermetically, peripherally welded to cap 34 at 52, to nut 54 at 56, to cap 42 at 58, and to nut 60 at 62. Plug 24, in operation, seats on shoulder 64, and plug 26, in operation, seats on shoulder 66, both of which shoulders may be provided with sealing washers or gaskets, fibrous or metallic, e.g., copper, to provide a double, liquid-tight seal, the inner seal at 64 being well protected from any impact to which the container is likely to be subjected. It is particularly noted that the corrugations of sleeve 50 readily permit impact compression of cap 42 toward cap 34 without destroying the sleeve 28 and leakproof port means 23 which it provides. Such a flexible or crushable sleeve also allows the use of resilient, rubber-like spacers such as 18 of FIGS. 1 and 2, whereby substantial impact and to and distortion of the container can be absorbed thereby without destroying the sealed port means. In the manufacture of the port means of FIG. 3, a useful welding sequence would be to first weld at 55, followed in order by welding at 56, 62, 52 and then at 58 after cap 42 has been placed over the outer end of tube wall 28. Alternatively to corrugated sleeve 50, the tube may be substantially straight but of thinner metal than other portions of the container such that it can readily crush under impact rather than ram against cap 34 and possibly puncturing it. Bung devices other than the screw-in plug type may be employed, such as for example, expandable elastomeric plugs, while still utilizing the indestructible characteristics of the present port means.

The base means generally designated 30 of FIGS. 1 and 2 may be of any useful configuration including simply the base portion 45 of the bottom end cap 44 and may be integrally formed with other portions of the shell means by metal forming or plastic molding operations in known manner. In a preferred embodiment, this base means is shown as being formed, e.g., in the shape of fork-lift line receptacles, although other shapes may be used, including short legs between which the tines can fit. The base means, in a general sense, also includes the saddle members 68 where such are desired, having outer foot or contact means 69 and affixed preferably by welding to the sidewall 40. These members can be provided in any number and in any geometric array around the periphery of wall 40, four being shown, but hexagonal, octagonal arrays, or the like also being useful. It is preferable that these members be hollow as shown at 70 such that the walls 72 thereof can crush under impact and absorb substantial impact energy which otherwise might apply directly against the container. Welding along the sides 74 and ends 76 of these members to the sidewall 40 greatly increases the crush or deformation strength of this wall.

Referring to FIGS. 4 and 5, the container is provided with a perimeter mounted angle iron frame generally designated 78, the end sections 79 thereof welded as at 80 to end the end cap means 42 and 44, to provide both crush protection and base means for stabilizing the container in a number of different positions, i.e., on any side or end thereof. End sections 79 are joined to upright frame members 81 by welding as at 83 thereto.

Referring to FIG. 6, wall means 14 is of substantially square cross section which automatically provides the base means by way of its sides 82, 84, 86, 88 and ends 90 and 92. In this or any of the other embodiments hereof, the spacing may be completely filled on the sides, top and bottom, preferably with tough, in-situ foamed or cured polymeric material such as polyurethane or epoxy which provides greatly enhanced puncture resistance, thermal insulation and, in the event of a puncture of both wall means 12 and 14, a degree of liquid absorbability when foamed polymer is employed.

Referring to FIG. 7, fluid spill protection is provided in the form of pan means generally designated 94 and comprising cap 42 and extended peripheral or annular wall portion 96 of sidewall 40. In this embodiment it is preferred that the base means be comprised of short legs 98 of angle iron or the like, and of sufficient length to contact the underlying cap 42 when the containers are stacked, to allow sufficient space between the upper surfaces of wall portions 96 and bottom cap 44 to allow the insertion of fork-lift tines underneath cap 44. Any number of such containers can be stacked in this manner, limited only by the strengths of the containers and the weights of their contents.

Figure 9:
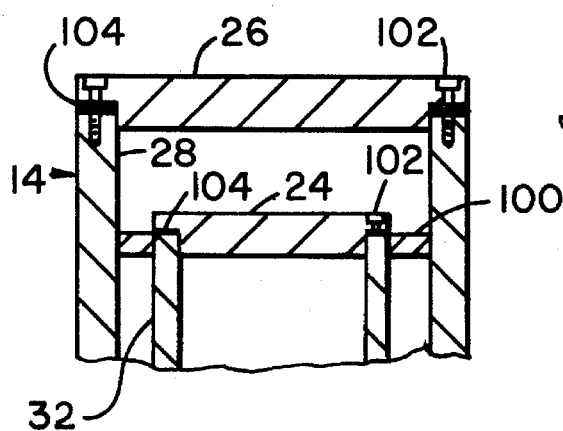
FIG. 9 is a cross-sectional view of an alternative embodiment of the container porting structure and closure means.

Referring to FIG. 9, the inner surface of second wall means 14 provides the tubular wall means 28, and annular ring spacer 100 hermetically welded completely around walls 32 and 14 complete the fluid-tight access port means 23. Plugs 24 and 26, in this embodiment are sealingly but removably secured in place by any means such as Allen bolts 102 and gaskets 104.

Figure 10:
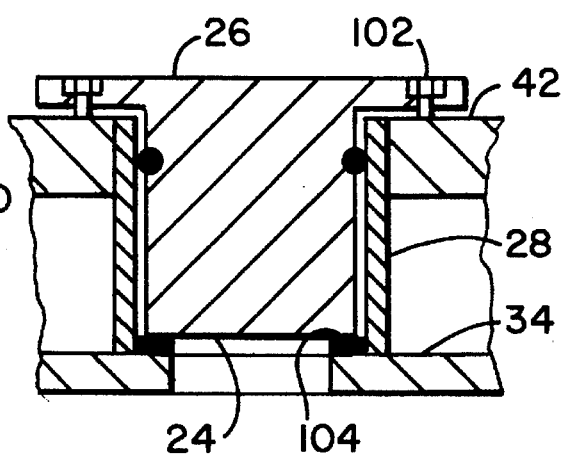
FIG. 10 is a cross-sectional view of another embodiment of the container porting structure and closure means.

In FIG. 10, plug 26 also provides plug portion 24 at its bottom surface. A sliding O-ring seal 105 for providing the seal or plug 26 is preferred in this embodiment in order to more readily accommodate variations from container to container in the distance between the upper surface of cap 42 and the upper sealing surface of cap 34.

Figure 11:
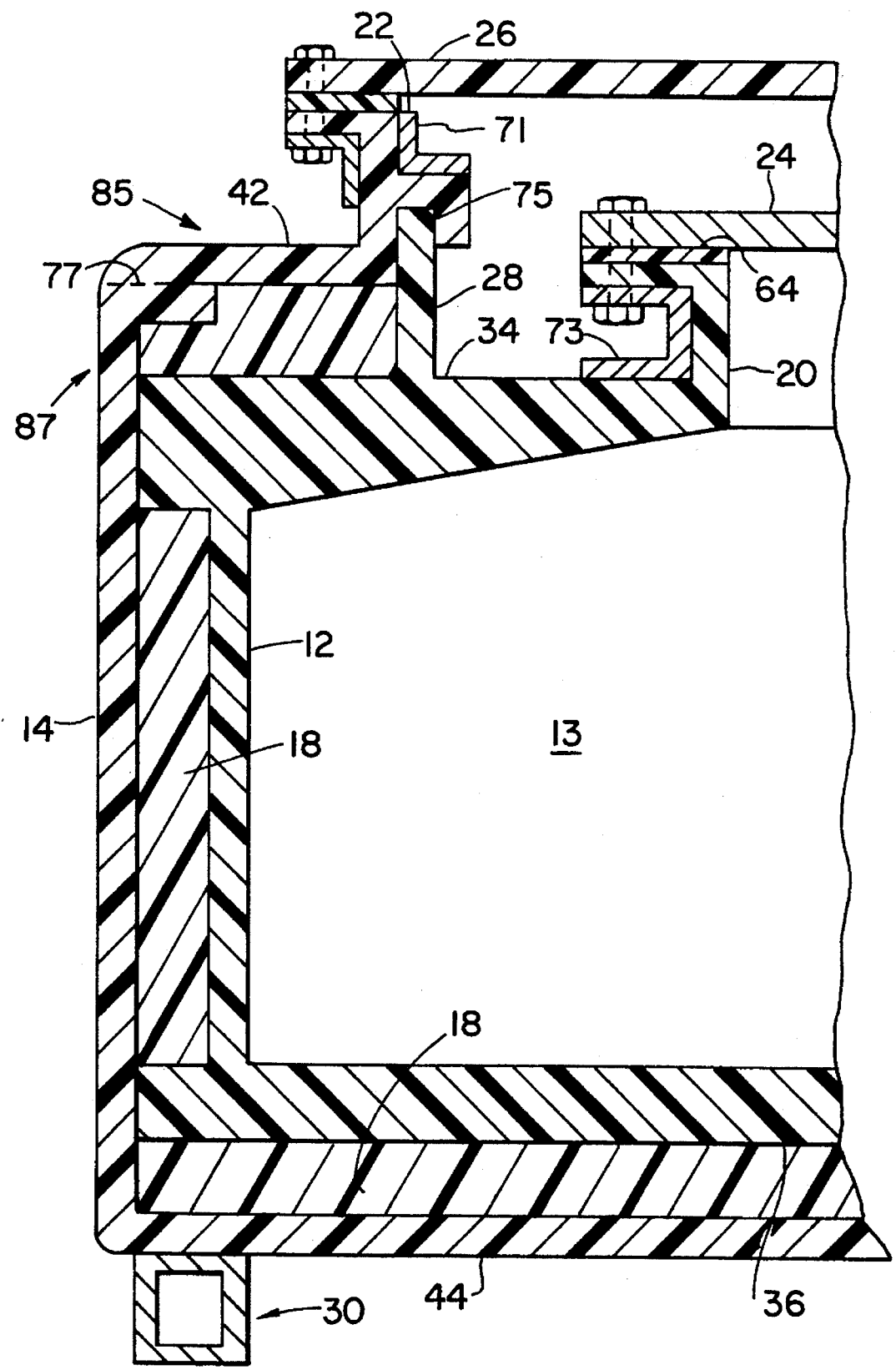
FIG. 11 is a cross-sectional view of approximately a longitudinal half of an embodiment of the container comprised substantially of plastic material.

Referring to FIG. 11 wherein similar or equivalent structural elements are numbered the same as in FIGS. 1–10, a substantially plastic container embodying the present invention is shown, i.e., preferably of or containing plastic comprising elastomeric or semi-rigid material such as structural grade polyolefin, polyurethane, silicone polymers, acrylics, butyl rubber, natural rubber, chlorosulfonated polyethylene, ethylenepropylene rubber, fluorinated polymers, neoprene, nitrile rubbers, polybutadiene, butadiene-acrylonitrile polymer, butadiene-styrene-acrylonitrile polymer, polyethers, polyisoprene, polypentenamers, styrene-butadiene rubber, and any of such polymeric materials copolymerized with vinylpyridine or methacrylic acid.

Such a wholly plastic or substantially plastic container would not be designed typically for taking the same level of physical abuse as the substantially metal container, however, the structure of its access port is based on the same design principals as for the porting of FIGS. 1–10, and the plastic container can withstand quite severe impact without causing leakage at the inner seal as at 64. In this embodiment, the first and second wall means 12 and 14, and including third wall means 28 and closure means 24 and 26, are comprised mainly of plastic material. Any of these structural sections, however, can be of steel or other metal for the purpose of accommodating some particular use for which a completely plastic container would not be desirable, as from, e.g., a strength or impact resistance standpoint. Also, various portions of the plastic sections may be reinforced as shown for example, by the metal rims 71, 73, i.e., annular, square, or the like to fit the shape of the particular structural plastic section. Such rims may be of any desired configuration and strength and can be adhesively affixed or bolted or the like to the section. The joints such at 75 can be made by plastic cement or the like and the first and second wall means can be made in upper and lower sections 85, 87 such as around the peripheral joint 77 of the second wall means such that the spacer material 18 can be placed and the annular joint 75 can be made as the upper section 85 is adhesively or otherwise affixed to lower section 87.

The invention has been described in detail with particular reference to preferred embodiments thereof, but it will be understood that variations and modifications will be effected within the spirit and scope of the invention.

We claim:

1. A reusable container unit for flowable materials, said unit having enhanced puncture resistance and leak prevention characteristics and comprising a substantially closed first wall means forming a vessel for containing said material and preventing leakage thereof, a substantially rigid protective shell formed by a substantially closed second wall means surrounding said vessel and spaced therefrom over at least a major portion of the outer surface of said first wall means to provide a protective spacing between said first and second wall means, wherein impact forces on said shell are not readily transmitted to said vessel, spacer cushion means positioned between said first and second wall means for maintaining said protective spacing therebetween, first aperture means through said first wall means and second aperture means through said second wall means forming an access port entering into said vessel for filling and emptying the same of flowable material, first closure means for said first aperture means and second closure means for said second aperture means, said first and second closure means being operable for selectively sealing or opening said apertures to allow the filling and emptying of said vessel, said first and second closure means being structurally and operably substantially independent of each other and spaced apart from each other to maintain the integrity of said protective spacing, third wall means forming a tubular shaped conduit having an inner end and an outer end and extending between said first and second wall means and having its said inner end sealingly affixed to said first wall means and its said outer end sealing affixed to said second wall means and encompassing said first and second aperture means respectively to substantially seal said third wall means between said first and second wall means and provide access to said first closure means for providing for the passage of said materials into and out of said vessel, said third wall means being readily distortionable under impact forces applied to said shell in the vicinity of said second closure means for minimizing the portion of said impact forces transmitted to said first wall means, and base means on said shell for contacting and stabilizing said container unit in at least one position on a support.

2. The container unit of claim 1 wherein a major portion of said spacing is filled with one or more protective materials selected from the group consisting of elastomer, foamed plastic, glass wool, steel wool, fiber wool, particulate absorbent clays, structural plastic, wood, fiber board or cellulosic material.

3. The container unit of claim 1 wherein said vessel and shell are made of steel, and a ratio of said spacing thickness to each of said wall means thickness is from about 4 to about 100.

4. The container unit of claim 1 wherein said spacer cushion means is distortionable under impact force applied to said protective shell to thereby provide enhanced energy absorbability thereto.

5. The container of claim 1 wherein each of said aperture means is threaded and one each of said closure means is matingly threaded for securement therein.

6. The container unit of claim 1 wherein said first, second and third wall means each is independently comprised substantially of material consisting of the group selected from metal or plastic.

7. The container unit of claim 1 wherein said third wall means is laterally corrugated to accommodate substantial axial compressibility upon impact.

8. The container unit of claim 1 wherein said second wall provides a containment pan at the top of said protective shell adapted to accommodate the base means of another container unit stacked thereon and to contain fluid which may spill downwardly therefrom.

9. The container unit of claim 1 wherein said third wall means has a thickness substantially less than the thickness of the adjacent portions of said second wall means such that said impact force will tend to distort said third wall means and be absorbed thereby.

10. The container unit of claim 1 having greatly enhanced puncture resistance, wherein said protective spacing is substantially filled with elastomeric material selected from the group consisting of natural rubber, isoprene, neoprene, butadiene-styrene, butadiene-acrylonitrile, butadiene-styrene-acrylonitrile, and polymers and copolymers of these materials copolymerized with vinylpyridine or methacrylic acid.

11. The container unit of claim 1 wherein said vessel is provided internally with a removable liner means.

12. The container unit of claim 1 wherein said vessel is internally coated with a chemical protective material.

13. The container unit of claim 1 wherein said first and second wall means respectively substantially define first and second drums each having a substantially cylindrical side and a substantially flat end, and wherein said apertures are located in adjacent portions of the ends of said drums.

14. The container unit of claim 13 wherein a portion of said base means comprises a plurality of elongated saddle members, each of which is affixed to the side of said second drum and extending substantially transversely thereof and having a substantially planar outer foot, each said saddle member being positioned on said side to provide positional stability to said container in a side-down position.

15. The container unit of claim 14 wherein each said saddle member is formed with an arcuate mounting surface which lies contiguous said cylindrical side along from ⅛ to ¼ of the periphery thereof.

16. The container unit of claim 1 wherein said first wall means substantially defines a drum having a substantially cylindrical sidewall which is butt-welded at each end to a domed end cap.

17. The container unit of claim 16 wherein said third wall means has a thickness substantially less than the thickness of the adjacent portions of said second wall means such that said impact force will tend to distort said conduit and be absorbed thereby.

18. The container unit of claim 17 wherein the protective spacing between said first wall means and said second wall means is substantially filled with in-situ foamed polymeric material which affords protection comprising one or more of the features of impact and penetration resistance, liquid absorbability, and thermal insulation.

19. The container unit of claim 18 wherein said second wall means provides a containment pan at the top of said protective shell adapted to accommodate the base means of another container unit stacked thereon and to contain fluid which may spill downwardly therefrom.

* * * * *